United States Patent [19]

Lesmeister

[11] 4,375,173
[45] Mar. 1, 1983

[54] SAW CHAIN HOLDING DEVICE

[76] Inventor: Adrian Z. Lesmeister, 2504 Linwood St., SW., Cedar Rapids, Iowa 52404

[21] Appl. No.: 252,236

[22] Filed: Apr. 8, 1981

[51] Int. Cl.³ .............................................. B23D 63/16
[52] U.S. Cl. ................................... 76/78 R; 269/87.2; 269/277; 76/36
[58] Field of Search ................... 76/78 R, 78 A, 25 A, 76/40, 37, 36; 269/87.2, 277, 289 R

[56] References Cited
U.S. PATENT DOCUMENTS
2,627,191 2/1953 Parr ......................................... 76/36
2,707,409 5/1955 Fitch ................................... 76/25 A FOREIGN PATENT DOCUMENTS
889253 9/1953 Fed. Rep. of Germany ..... 76/25 A Primary Examiner—Roscoe V. Parker
Attorney, Agent, or Firm—Hosier, Niro & Daleiden, Ltd.

[57] ABSTRACT

A device for holding a saw chain during sharpening of the chain cutters which prevents wobble by gripping both the cutter train and the drive train of the saw chain.

9 Claims, 4 Drawing Figures

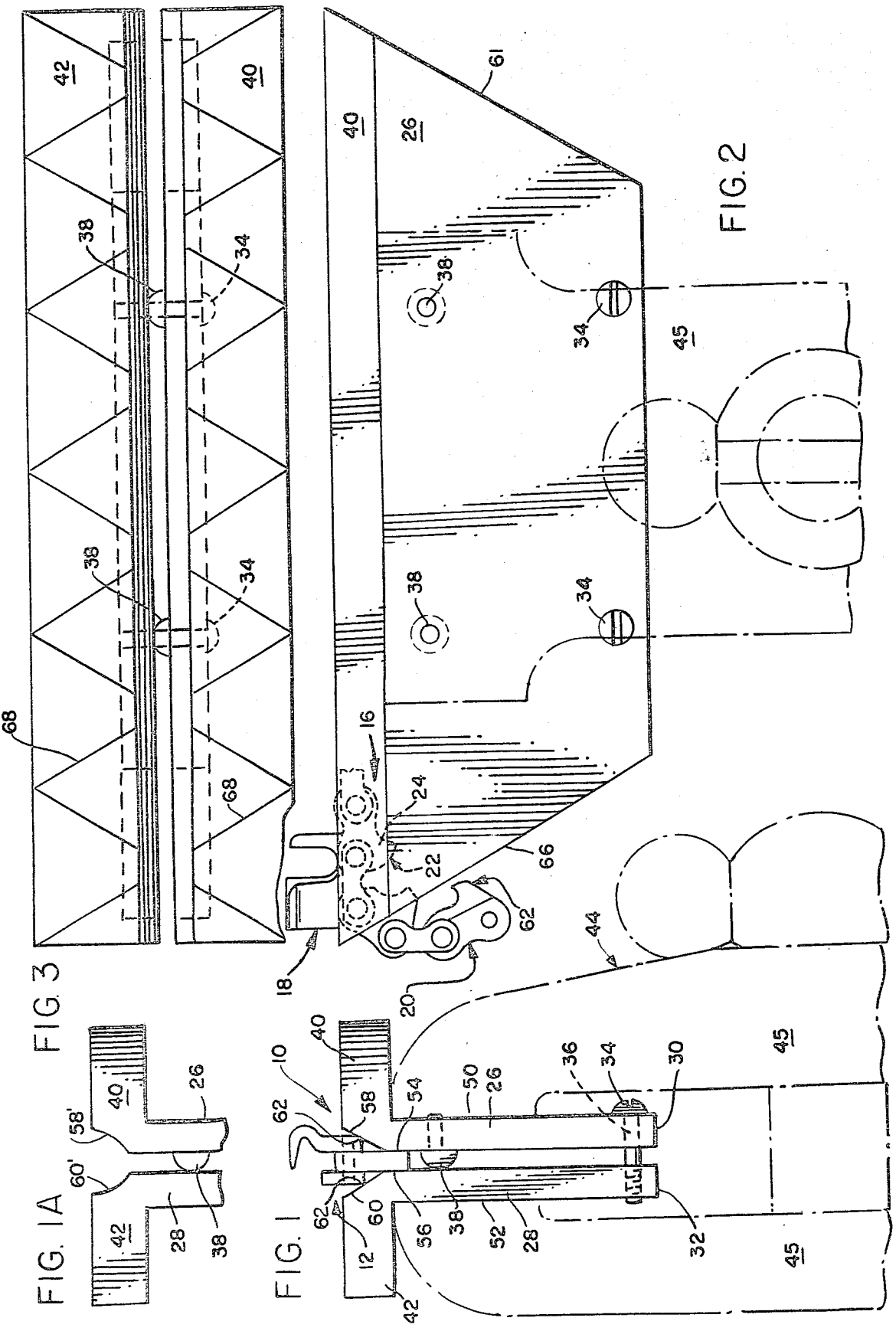

SAW CHAIN HOLDING DEVICE

BACKGROUND OF THE INVENTION

This invention relates generally to a device for holding a portion of a saw chain during sharpening of the chain cutters. The device is intended to rest in a vise having opposed movable jaws so that tightening of the vise will cause the holding device to firmly grip the saw chain while permitting access to the chain cutters for sharpening.

In order to properly sharpen the cutters of a saw chain it is necessary to hold the cutters firmly in place while drawing a file across the cutters at the appropriate angle. Since the shape of the chain is irregular, it is difficult to grip the chain in a manner firm enough to prevent wobble in the cutters as the file is moved back and forth.

One approach taken in the prior art has been to leave the chain mounted on the saw and clamp the saw plate in place while filing the chain cutters. This approach is described in U.S. Pat. No. 3,029,663. While the '663 approach may eliminate all movement in the saw plate itself during sharpening of the cutters, the cutters will nevertheless be subject to excess wobble within the track of the plate.

Another, somewhat more promising approach, has been to clamp the flat drive chain cogs which protrude below the cutter train of the saw chain during sharpening of the cutters. A number of variations on this approach are represented in the following U.S. Pat. Nos.: 2,413,919; 2,627,191; 2,798,385; 3,013,448; 3,083,591; and 3,114,275. Although this approach certainly minimizes cutter wobble during sharpening, it fails to reduce this problem to a level which will insure maximum cutter sharpness and accuracy.

The failure of the latter prior art clamping arrangement to eliminate objectionable wobble during sharpening is believed to arise from the relatively small cog area available for clamping the saw chain. It probably also results from the spacing between the cutter edge being filed and the clamped cog which produces a torque arm at the point of retention. Whatever the source of this problem, the fact remains that notwithstanding its wide availability in the patent art, this prior approach has not received wide acceptance in the marketplace.

In yet another alternative approach, the irregular outside faces of the saw chain are clamped in lieu of either the drive cogs or the saw plate. This approach, which is illustrated in U.S. Pat. No. 2,824,469, is highly undesirable because the irregular outside faces of the chain cannot be firmly clamped by the flat clamp plates utilized in the '469 device. Thus, again the chain cutters will wobble during sharpening, impairing cutter sharpness and accuracy and precluding commercial acceptance of this approach.

SUMMARY OF THE INVENTION

Accordingly, an important object of the present invention is to provide a simple and inexpensive device for holding a saw chain in which wobbling of the chain cutters during sharpening is eliminated.

Another object of the present invention is to provide a device for holding a saw chain which may be simply and conveniently mounted and operated in a common bench vise to permit rapid and efficient sharpening of the chain cutters.

Other objects and advantages of the present invention will be apparent from the discussion hereinafter.

The present invention is directed to a saw chain holding device intended to be operated in a vise having opposed movable jaws to hold successive portions of the saw chain for sharpening. The device is used with a saw chain in which a cutter train straddles an interconnecting drive train with cogs of the drive train protruding below the cutter train.

The holding device includes a pincer section for resting in the vise opposite the movable jaws. The pincer section closes as the jaws are moved together to bring a gripping means into gripping contact with both the cutter train and the drive train of the saw chain. This dual gripping action effectively eliminates wobble of the chain cutters during sharpening.

The present invention fulfills an important need in the art by making it possible to hold saw chains in a manner sufficiently firm to effectively eliminate wobble in the chain cutters as sharpening proceeds. Since the device is inexpensive and simple to operate, it significantly improves saw chain handling and sharpening by professional and non-professional alike.

The various features and advantages of the present invention will become apparent upon examination of the following specification and drawings, together with the claims. While the invention is described below in connection with preferred or illustrative embodiments, these embodiments are not intended to be exhaustive or limiting of the invention. Rather, the invention is intended to cover any alternatives, modifications and equivalents that may be included within its spirit or scope, as defined by the appended claims.

BRIEF DESCRIPTION OF THE DRAWINGS

The invention, together with further of the objects and intended advantages, will be best understood by reference to the following description, taken in conjunction with the accompanying drawings in which:

FIG. 1 is a side view of a holding device according to the present invention, mounted in a vise.

FIG. 1A is a fragmentary side view of an alternative embodiment of the holding device illustrated in FIG. 1.

FIG. 2 is an elevation view of the holding device illustrated in FIG. 1.

FIG. 3 is a plan view of the holding device illustrated in FIGS. 1 and 2.

DESCRIPTION OF THE PREFERRED EMBODIMENT

Turning first to FIG. 1, there is illustrated a device 10 for holding a portion of a saw chain 12 during sharpening of the chain cutters 14. The saw chain comprises a cutter train 16 (FIG. 2) comprising alternating cutter links 18 and tie strap links 20 which straddle drive links 22. The drive links have cogs 24 which protrude below the cutter train.

Holding device 10 comprises a pair of upright members 26 and 28 which are pivotably attached near their bottom edges 30 and 32 by bolts 34 which are threaded into plate 28 and fit loosely in bores 36 in plate 26. Plates 26 and 28 are spaced apart by a rubber bumper 38 which is mounted to plate 26.

Plates 26 and 28 have collars 40 and 42 protruding generally perpendicularly from the outer faces of the plates. The holding device is placed in a bench vise 44 with the bottoms 46 and 48 of the collars resting on the tops of vise jaws 45 and pincer portions 50 and 52 biased against the jaws by rubber bumper 38.

Dual means for gripping both the cutter train and the drive train are provided in the form of opposing cog clamp portions 54 and 56 of the plates and chamfer relief portions 58 and 60 thereof. Thus, as the pincer portions are pressed together beyond the point of contact between bumper 38 and plate 28 by vise jaws 45, the resilient bumper flattens, causing the lower edges 62 of the drive train to ride up along the relief portions raising the saw chain until the cog clamp portions grip drive cogs 24. At this point the upward movement of the chain is halted and the relief portions are pressed against the drive chain edges. The chain is thus restrained both at the drive cogs and at the cutter train to grip the overall chain far more firmly than was heretofor possible. Furthermore, the holding device is able to accommodate a wide range of saw chain sizes due to the self-adjustment inherent in the co-operating cog clamp and relief portions. This dual gripping action is an important aspect of the present invention, since it effectively eliminates all wobble in the chain cutters during sharpening.

Although relief portions 58 and 60 are shown as flat chamfers in FIG. 1, they are preferably in the form of concave chamfers 58' and 60', as shown in FIG. 1A. The concave chamfers embrace the cutter train more effectively by increasing the lateral gripping force between the relief surfaces and the cutter train.

Plates 26 and 28 may be undercut as shown at 66 in FIG. 2 to prevent interference between portions 62 and 64 of the chain adjacent to the chain portion to be held for sharpening and the plates as they are moved together. Finally, in FIG. 3 decals 68 are illustrated, applied to the top face of each of the collars 46 and 48. The lines of these decals are intended to act as file guides to establish the proper sharpening angle for each cutter. Naturally, different decals are applied where differing sharpening angles are required.

The present invention thus provides a simple and convenient chain holding device which will grip a saw chain firmly enough to effectively prevent wobbling during sharpening of the chain. The holding device is inexpensive and simple to operate, and can accept a wide range of different chain sizes.

What is claimed is:

1. A device, operated in a vise having opposed movable jaws, for holding a portion of a saw chain during sharpening of the chain cutters, the saw chain including a cutter train straddling a drive train with cogs of the drive train protruding below the cutter train, comprising:

two corresponding plates pivotably joined near their lower edges, said plates being adapted to rest in the vise with a pincer section of the plates opposite the movable jaws; and means movable in conjunction with said pincer section for gripping both the cutter train and the drive train while permitting access to the chain cutters for sharpening, said gripping means comprising a pair of upright members with opposing cog clamp portions close to the top edges of said upright members for engaging the cogs and opposing relief portions comprising confronting chamfers along said top edge portions for engaging the cutter train.

2. A device, operated in a vise having opposed movable jaws, for holding a portion of a saw chain during sharpening of the chain cutters, the saw chain including a cutter train straddling a drive train with cogs of the drive train protruding below the cutter train, comprising:

a pincer section for resting in the vise opposite the movable jaws so that said pincer section will close as the jaws are moved together; and means, movable in conjunction with said pincer section, for gripping both the cutter train and the drive train cogs while permitting access to the chain cutters for sharpening, said gripping means comprising a pair of upright members having opposing cog clamp portions for engaging the cogs and confronting chamfers along the top edges of said upright members for engaging the cutter train.

3. The holding device of claim 2 wherein said chamfers are concave.

4. The holding device of claim 2 including means for biasing said pincer section against the opposed movable jaws of the vise.

5. The holding device of claim 4 wherein said biasing means comprises a rubber bumper disposed within said pincer section.

6. The holding device of claim 2 wherein said upright members have undercut ends to prevent interference with the movement of said upright members by portions of the chain adjacent to the chain portion being held.

7. A device, operated in a vise having opposed movable jaws, for holding a portion of a saw chain during sharpening of the chain cutters, the saw chain including a cutter train straddling a drive train with cogs of the drive train protruding below the cutter train, comprising:

a pincer section for resting in the vise opposite the movable jaws so that said pincer section will close as the jaws are moved together; and means, movable in conjunction with said pincer section, for gripping both the cutter train and the drive train cogs while permitting access to the chain cutters for sharpening, said gripping means comprising a pair of upright members having opposing cog clamp portions for engaging the cogs and opposing relief portions for engaging the cutter train, said relief portions including means for first raising the saw chain until said cog clamp portions grip the cogs, and then gripping the cutter train, thereby permitting said holding device to accommodate saw chains of varying sizes.

8. The holding device of claim 7 wherein said relief portions comprise confronting chamfers along the top edges of said upright members.

9. The holding device of claim 8 wherein said chamfers are concave.

* * * * *